(12) United States Patent
Cochrane

(10) Patent No.: US 7,331,568 B2
(45) Date of Patent: Feb. 19, 2008

(54) APPARATUS FOR USE WITH COILED BARRIER MATERIAL

(75) Inventor: Richard Bruce Cochrane, Kempton Park (ZA)

(73) Assignee: Cochrane Steel Products (PTY) Ltd., Kempton Park (ZA)

( * ) Notice: Subject to any disclaimer, the term of this patent is extended or adjusted under 35 U.S.C. 154(b) by 737 days.

(21) Appl. No.: 10/795,220

(22) Filed: Mar. 9, 2004

(65) Prior Publication Data

US 2005/0226696 A1  Oct. 13, 2005

(51) Int. Cl.
*B21F 25/00*   (2006.01)
*B66D 1/00*    (2006.01)

(52) U.S. Cl. .................. 256/2; 256/11; 254/265; 414/680

(58) Field of Classification Search .............. 254/265, 254/266; 414/680; 256/1–8; 211/85.11
See application file for complete search history.

(56) References Cited

U.S. PATENT DOCUMENTS

| | | | | |
|---|---|---|---|---|
| 3,070,946 A | * | 1/1963 | Kirsch et al. | 57/1 R |
| 3,155,374 A | * | 11/1964 | Sieffert | 256/2 |
| 4,484,729 A | * | 11/1984 | Mainiero et al. | 256/1 |
| 4,503,423 A | * | 3/1985 | Mainiero et al. | 340/552 |
| 4,744,708 A | * | 5/1988 | Cochrane | 410/47 |
| 4,978,943 A | * | 12/1990 | Mainiero et al. | 340/566 |
| D429,342 S | * | 8/2000 | Binns | D25/46 |
| 6,682,279 B2 | * | 1/2004 | Pessach et al. | 410/36 |
| 2003/0099523 A1 | * | 5/2003 | Pessach et al. | 410/42 |
| 2006/0022184 A1 | * | 2/2006 | Pavlov | 256/2 |

* cited by examiner

*Primary Examiner*—Peter M. Cuomo
*Assistant Examiner*—Evan Langdon
(74) *Attorney, Agent, or Firm*—Bacon & Thomas, PLLC

(57) ABSTRACT

Apparatus for dispensing coiled barb tape which includes a frame in which is located a boom from which the coiled barb tape is suspended. The boom is extensible to assist in deployment of the barb tape and the frame, apart from protecting the coiled barb tape, provides a stacking characteristic with similar frames.

9 Claims, 8 Drawing Sheets

APPARATUS FOR USE WITH COILED BARRIER MATERIAL

BACKGROUND OF THE INVENTION

This invention relates generally to the deployment or recovery of coiled barrier material formed with a plurality of windings. The barrier material may comprise barb tape, barb wire or any similar deterrent material.

The specification of U.S. Pat. No. 4,744,708 describes a barrier which can be deployed from a load bed of a trailer or other vehicle and which includes a number of stacked coils in a pyramid-like structure with an uppermost coil engaged with a rigid boom cantilevered above the load bed. This type of arrangement works satisfactorily but it requires a dedicated road-going vehicle.

A need exists for an alternative mechanism which can be used with coiled barrier material and which does not necessarily require a dedicated vehicle. It is also desirable to be able to provide a measure of protection for the barrier material so that, at least during transport or storage, the barrier material is less likely to be damaged.

SUMMARY OF INVENTION

The invention provides apparatus for use with at least one coil of barrier material which is formed with a plurality of windings of the barrier material, the apparatus including a ground-engaging structure, a support which extends upwardly from the ground-engaging structure, and a boom arrangement which has a first end, attached to the support, and a free end, and which is spaced from, and positioned above, the ground-engaging structure, the boom arrangement being insertable into the at least one coil of barrier material so that the at least one coil is then suspended from the boom arrangement, and a boom extension piece which is movable from a storage position to an operative position at which the boom extension piece projects from the free end of the boom arrangement.

The boom extension piece may be detachably engageable with the boom arrangement. It is preferred however that the boom extension piece is pivotally attached to the free end of the boom arrangement and that it is movable relatively thereto between the storage position and the operative position.

Preferably, in the storage position, the boom extension piece hangs downwardly from the free end of the boom arrangement and acts to retain the at least one coil of barrier material, in a compressed state, on the boom arrangement. The boom extension piece may include an outer end, an inner end which is adjacent the free end of the boom arrangement and which, as noted, is preferably pivotally attached to the boom arrangement, and a region, between the outer end and the inner end, which is higher than the outer end and the inner when the boom extension piece is in the operative position. A smooth transition may be provided between the boom arrangement and the boom extension piece to facilitate sliding of the at least one coil of barrier material along the length of the boom arrangement and the boom extension piece.

The boom arrangement is preferably shaped so that the at least one coil of barrier material is suspended, at least at two locations, from the boom arrangement. This may be achieved in any appropriate way and for example the boom arrangement may include at least two elongate boom members which project from the support and which are spaced apart thereby to provide support for the at least one coil of barrier material at the two locations.

In an alternative arrangement an upper surface of the boom arrangement is formed from sheet material which is appropriately shaped e.g. curved so that support for the at least one coil of barrier material is provided over an extended region.

The ground-engaging structure may be of any appropriate type and, without being limiting, the ground-engaging structure may include at least two spaced apart formations with which tines of a forklifter are engageable.

Each of the formations may be in the nature of a recess into which a respective tine is insertable and the recess may be provided at one end of a respective beam member which may be of tubular or channel shape.

The apparatus may be provided in combination with a parallelepiped frame which is mounted to the ground-engaging structure and which encloses the boom arrangement. Preferably the frame has upper and lower complementary formations which enable the frame to be stacked with a similar frame in a vertically extending array.

BRIEF DESCRIPTION OF THE DRAWINGS

The invention is further described by way of example with reference to the accompanying drawings in which.

DESCRIPTION OF PREFERRED EMBODIMENT

Figure 1:
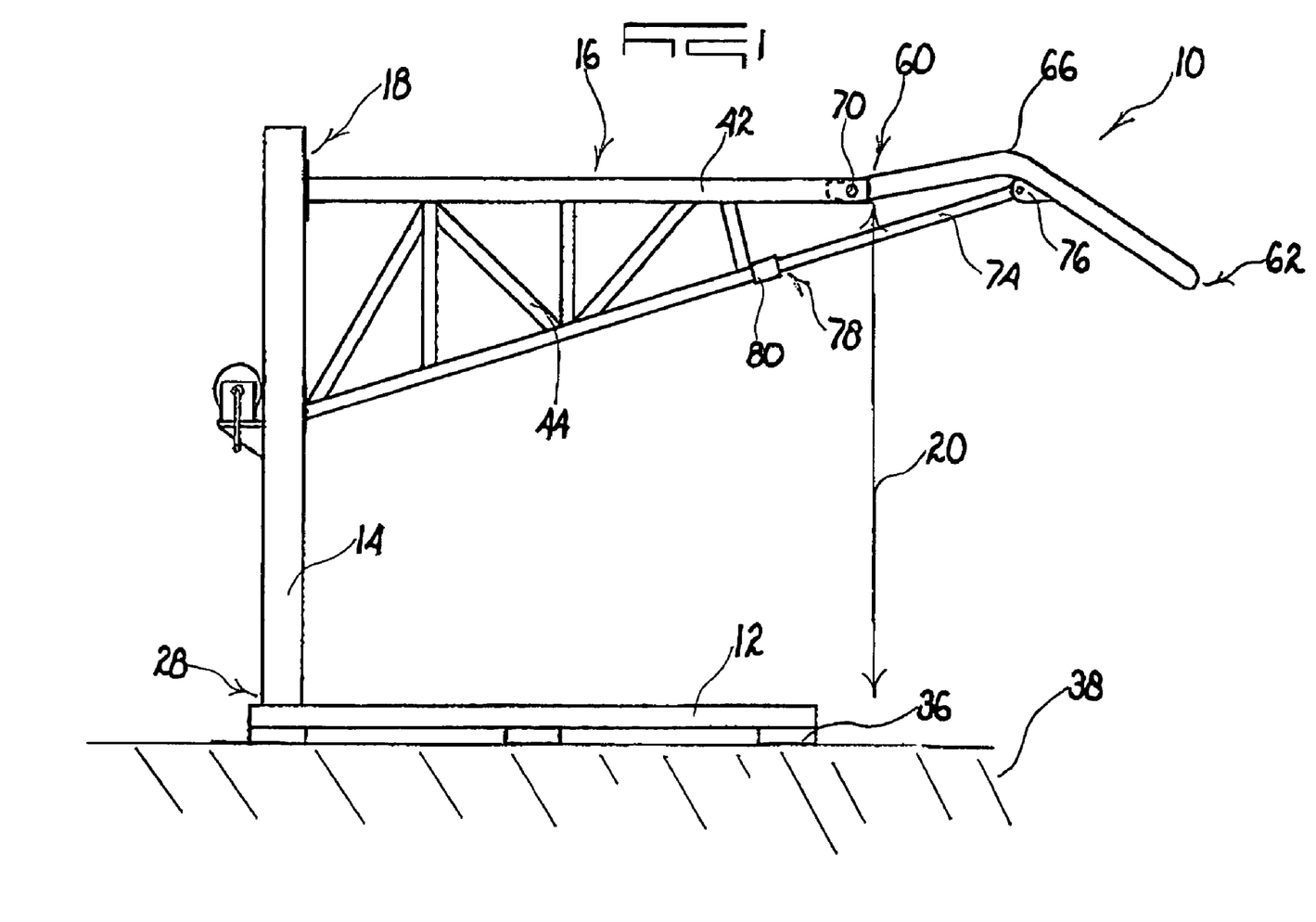
FIG. 1 is a side view of apparatus according to the invention.
Figure 2:
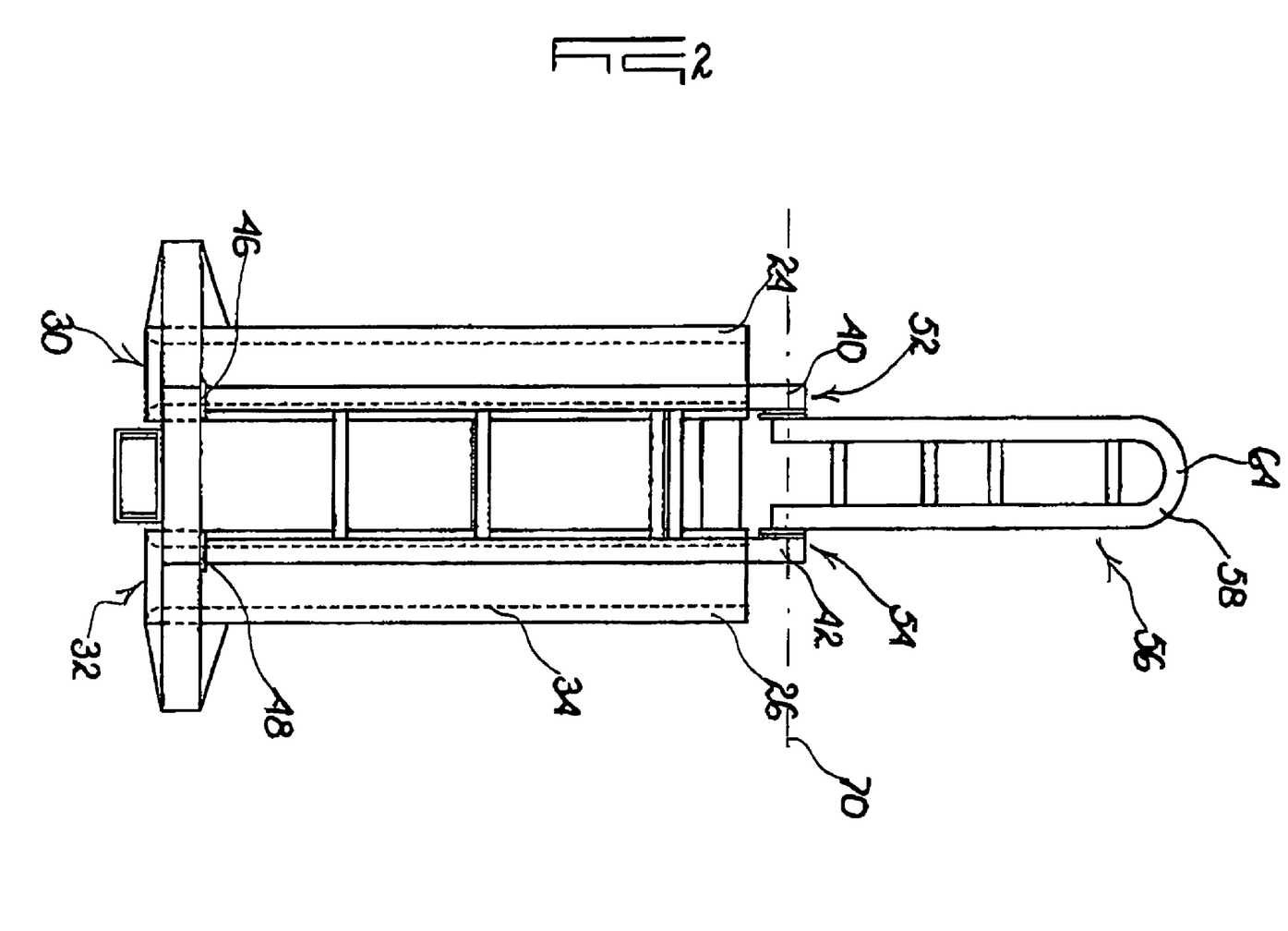
FIG. 2 is a plan view of the apparatus shown in FIG. 1.
Figure 3:
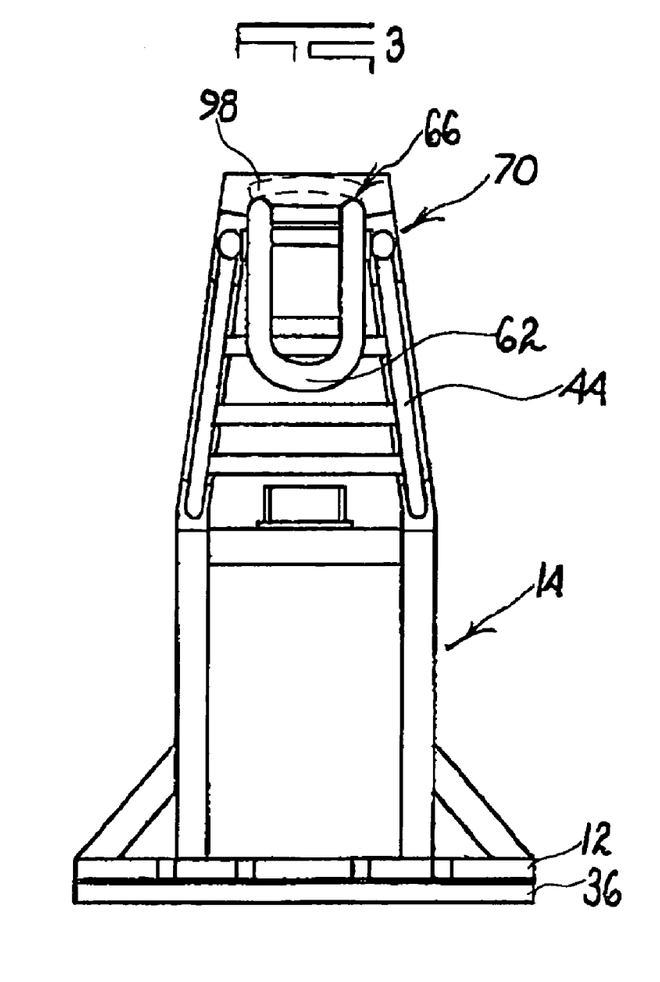
FIG. 3 is a view in a direction of an arrow "3" of the apparatus shown in FIG. 1.

FIGS. 1 to 3 of the accompanying drawings illustrate apparatus 10 according to the invention in an operative mode from the side, in plan and from one end respectively.

The apparatus 10 includes a ground-engaging structure 12, a pedestal-like support 14 which extends upwardly from one end of the structure 12, and a boom arrangement 16 which is attached at a first end 18 to the support, near an upper end thereof, and which extends in cantilever fashion over the ground-engaging structure 12 being spaced therefrom by a distance 20.

The ground-engaging structure 12 includes two elongate beams 24 and 26 respectively which are spaced apart and which are substantially parallel to each other. At ends which are adjacent a base 28 of the support 14 the beams form respective recesses 30 and 32 into which tines of a forklift device not shown, are respectively insertable. Each beam 24 may be formed from tubular material or from a channel-type structure with in-turned downwardly facing flanges 34 shown in dotted outline in FIG. 2. The beams may be fabricated from suitable sections or they may be formed from integrally manufactured off-the-shelf components.

FIGS. 1 and 3 illustrate that feet 36 are fixed to under surfaces of the beams so that the beams are slightly raised above the ground 38.

The boom arrangement 16 includes two elongate boom members 40 and 42 respectively which are supported by a lattice structure 44 which extends from the support 14. The beam members are made from circular tube and at the first end 18 of the boom arrangement are attached by means of respective flanges 46 and 48 to the support 14.

The boom members have free ends 52 and 54 respectively. A boom extension piece 56 is pivotally attached to the free ends. The boom extension piece includes an elongate U-shaped (when viewed in plan) component 58 which is formed from a bent tube which has a first end 60 which is pivotally attached to the boom members and an outer end 62 which terminates in a outwardly curved section 64. Viewed from the side it can be seen that, with the boom extension piece is in what is referred to hereinafter as an operative mode or position, an intermediate region 66 of the boom extension piece is raised and is higher above the ground 38 than the inner end 60 or the outer end 62.

The boom extension piece is pivotally movable relatively to the boom members about a horizontally extending axis 70. Hinged joints which are used to secure the boom extension piece to the boom members are of such a nature that the hinged joints do not have any projections or other components which interfere with the smooth transition between the boom extension piece and the boom members, at least on the upper surfaces, at least when the boom extension piece is in the operative position shown in FIG. 1.

A brace 74 is pivotally attached at one end 76 to the boom extension piece while an opposing end 78 is engageable with a socket 80 which is fixed to the lattice structure. By elevating the boom extension piece slightly the end 78 can be disengaged from the socket. On the other hand the end 78 remains firmly engaged with the socket under the action of gravity in normal usage.

Figure 5:
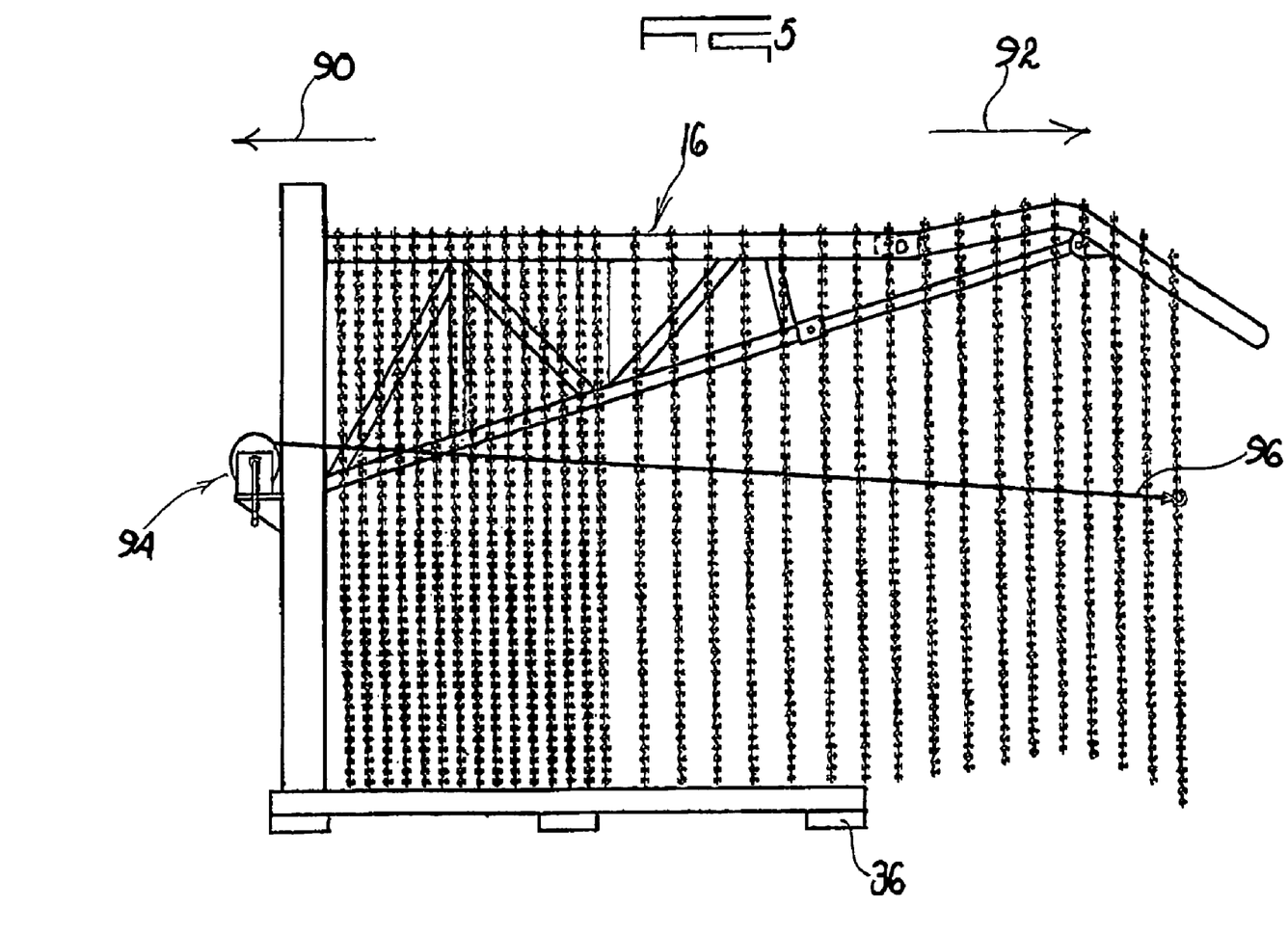
Figure 6:
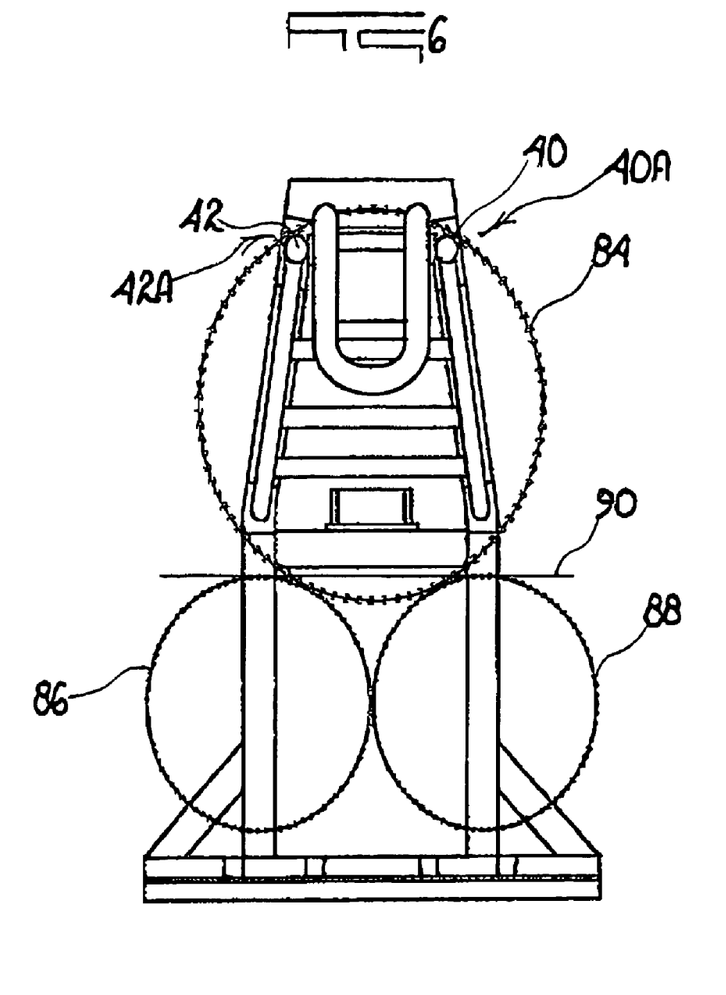
Figure 7:
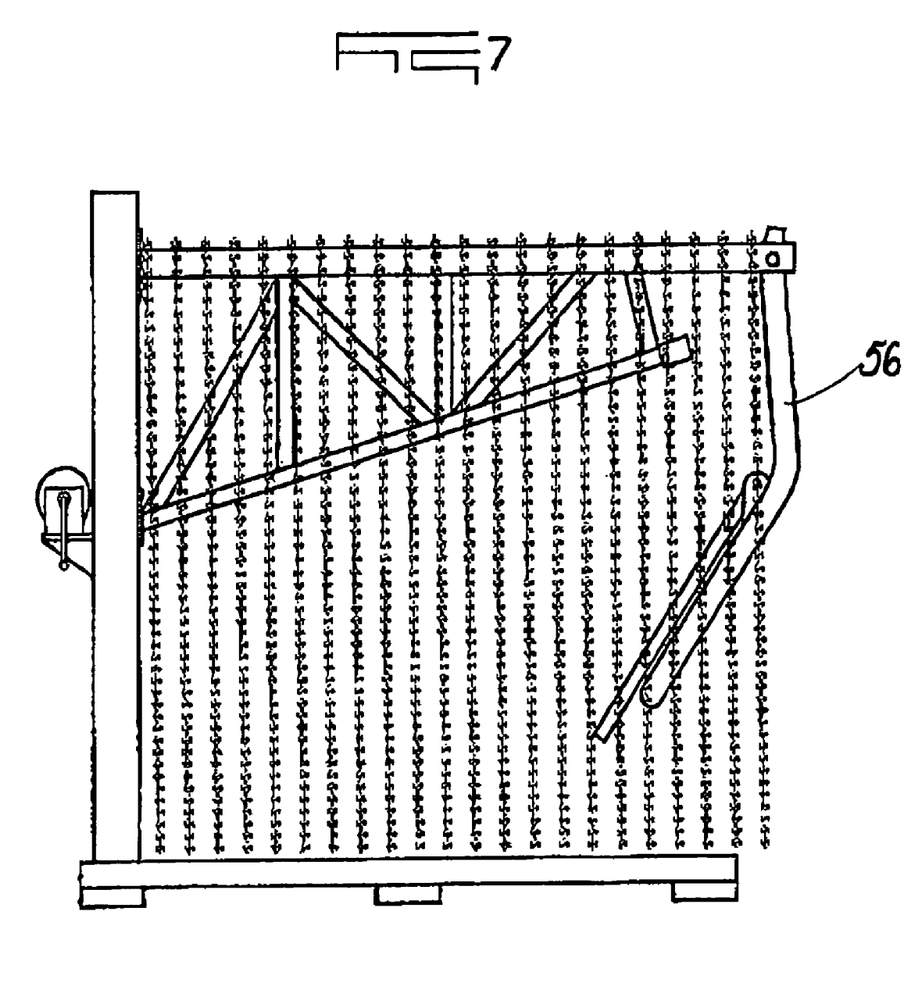

FIGS. 5, 6 and 7 illustrate an upper coil 84 of barrier material, e.g. barb tape, which includes a plurality of windings of the barrier material, positioned, in pyramid fashion, on underlying similar coils 86 and 88 respectively which may be of the same or different diameter. Use may be made of stays or braces 90 to position the coils relatively to each other and the coils may be fixed to each other by means of clips, not shown, which interconnect selected windings of the coils to each other or which connect selected windings to the stays 90.

Figure 4:
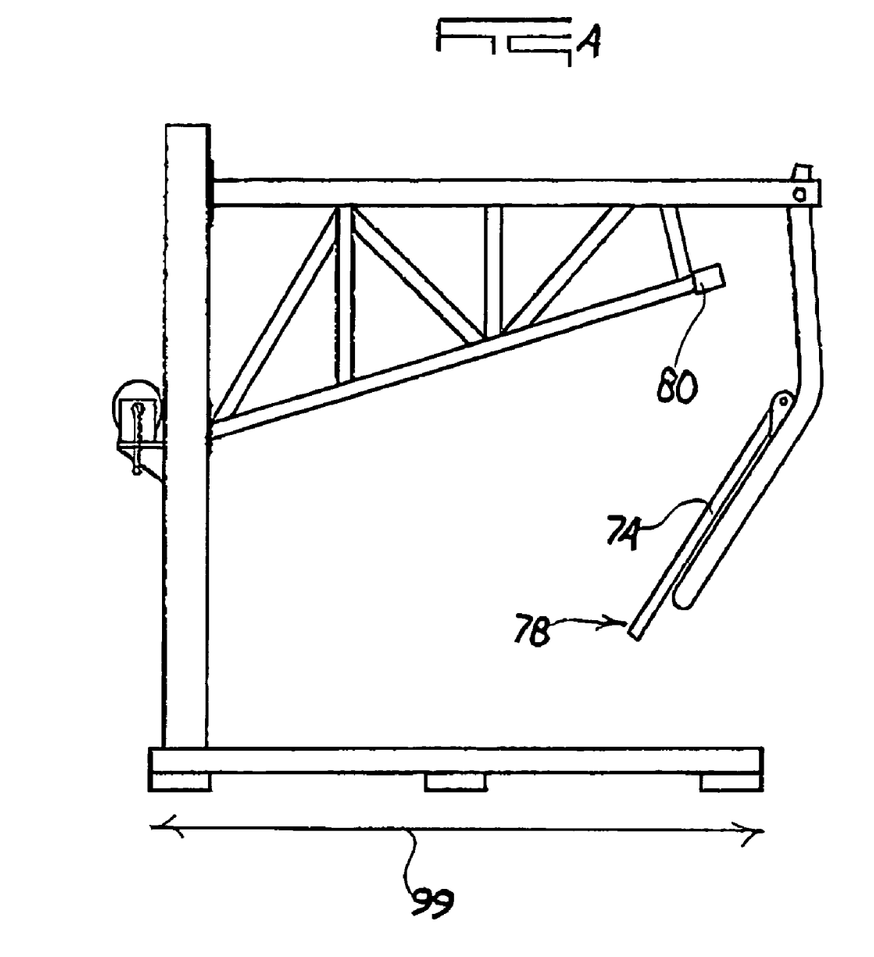
FIG. 4 shows the apparatus of FIG. 1 in a storage or transport mode, FIGS. 5, 6 and 7 correspond respectively to FIGS. 1, 3 and 4 and show the apparatus with barrier material engaged with the apparatus.

FIG. 4 illustrates the apparatus 10 in a storage mode or position without the barrier material while FIG. 7 corresponds to FIG. 4 but with the inclusion of the barrier material. In this storage mode the coils 84, 86 and 88 are compressed in an axial direction so that their respective windings are urged tightly towards each other. If the barrier material is made from barb tape then this type of material has an inherent resilience due to the high tensile nature of core wires which are used in the windings. Thus when the barrier material is compressed there is a natural tendency for the compressed coil material to extend axially and, to restrain this, it is normally necessary to make use of ties or restraints which retain the coils in an axially compressed configuration.

When the coils are compressed, then as is shown in FIGS. 4 and 7, the boom extension piece 56 can be pivoted from the operative mode shown in FIG. 1 to a position at which the boom extension piece hangs downwardly from the free end of the boom arrangement. It is possible to lock the boom extension piece in this position so that it thereby forms a sturdy retaining device which helps to ensure that the barrier material remains on the boom arrangement 16.

An inspection of FIG. 6 shows that the spaced boom members 40 and 42 support the uppermost coil 84 at least at two spaced locations designated 40A and 42A respectively in FIG. 6. This is important for two spaced apart supports, as opposed to a single support engaged with the uppermost coil, help to stabilise the coil assembly particularly during transport. If use is made of a single support which passes through the interior of the upper coil 84 then there is a natural tendency for the coil assembly to pivot about the single support and swing from side to side particularly during transport.

If the barrier is to be deployed then the boom extension piece is moved to the operative mode shown in FIGS. 1 and 5. The ties which retain the coiled barrier material in the compressed configuration are released and there is a natural tendency, as noted, for the barrier material to extend in an axial direction. The raised region 66 of the boom extension piece is important in this respect for it provides a stop formation which allows a small degree of axial expansion of the barrier material to take place but which prevents the barrier material from freely sliding from the boom arrangement or the boom extension piece. Also, when the coiled material is withdrawn from the boom arrangement, the raised region helps to exert a restraining force which tends to cause the windings to extend to their correct inter-winding spacing.

It is possible to move the apparatus 10 together with the barrier material which is suspended from the boom arrangement by means of a forklifter, not shown, tines of which are inserted into the recesses 30 and 32 respectively. This provides a convenient and inexpensive manner of moving the apparatus from a storage location to an operative location. At the operative location the forklifter can again be used to dispense the coiled barrier material. A free end of the barrier material is then anchored to ground or to fixed structure and the apparatus is moved in the direction of an arrow 90 in FIG. 5 to extend the barrier material in concertina fashion away from the anchored end or fixed structure. Alternatively, depending on the labour which is available, the apparatus 10 is placed on the ground with the ground-engaging feet 36 resting on the ground and the free end of the coil assembly is drawn manually from the boom arrangement and over the boom extension piece, in the direction of an arrow 92, so that it can be deployed along a selected path.

With either approach once the coil material has been dispensed the forklifter can be used to position the apparatus 10, without the coil material, at a convenient location. Clearly the apparatus can be used, when required, to provide a means for recovery of the coiled material which is then axially compressed and positioned so that the boom arrangement 16 fits into the uppermost coil 84 and provides a suspension structure for the coil assembly.

A winch 94 which may be electrically or manually operated can be mounted to the support. A cable 96, on the winch, can then be engaged with the extended coil material. The winch can then be used to help draw the barrier material onto the boom arrangement 10.

The invention as described thus far has a number of important benefits. Firstly the boom arrangement supports the coil assembly at least at two spaced locations and this, as noted, helps to restrain the coil assembly from swinging to and fro on the boom arrangement. A similar effect can be achieved by using a curved steel plate 98, shown in dotted outline in FIG. 3, over an upper surface of the boom arrangement. Secondly the apparatus can be transported using a forklifter and consequently the need for a dedicated trailer or similar vehicle is dispensed with. Thirdly the boom extension piece acts as a retaining mechanism, in the storage mode, which helps to retain the coiled barrier material in a compact configuration on the boom arrangement. This is important for, with the boom extension piece in the storage mode, the length of the apparatus, designated 99 in FIG. 4, is only slightly greater than the length in the axial direction of the compressed coils of barrier material. The boom extension piece, when used in the manner shown in FIG. 5, enables the compressed coils of barrier material to be released whilst ensuring that the coils remain suspended from the boom arrangement and the boom extension piece.

Figure 8:
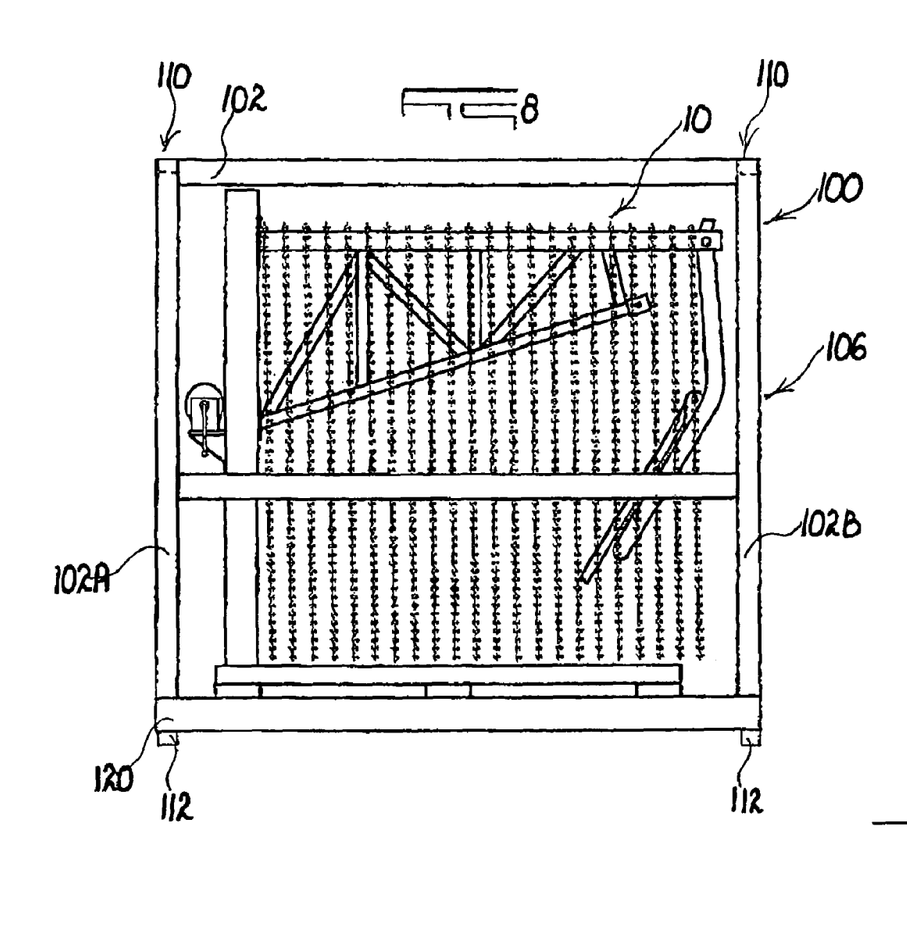
FIG. 8 illustrates an arrangement wherein a protective frame is provided in combination with the apparatus of FIG. 1.
Figure 9:
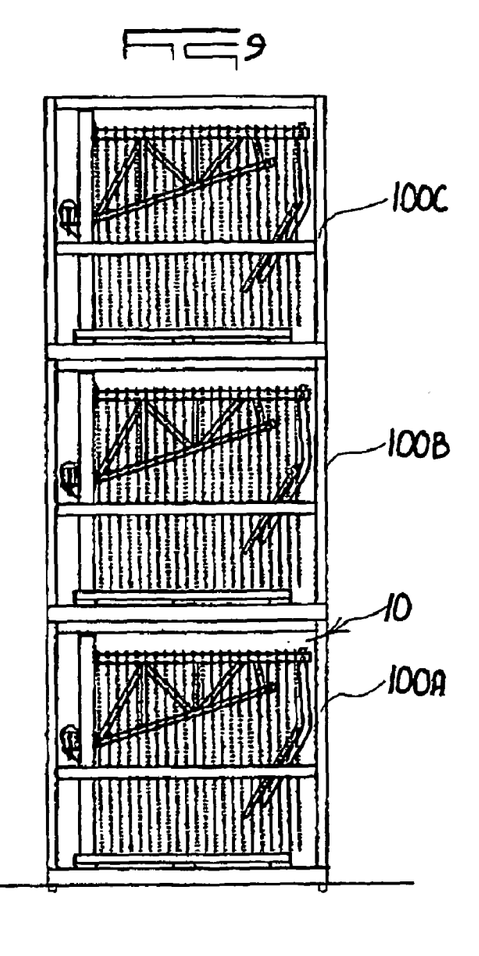
FIG. 9 illustrates how the arrangement of FIG. 8 can be positioned in a stacked assembly with similar arrangements.

FIGS. 8 and 9 illustrate that the apparatus 10 can be combined with a parallelepiped frame structure 100. The frame structure 100 includes at least four corner posts only two of which, marked 102A and 102B are visible, which extend upwardly from respective corners of the ground-engaging structure 120 or extensions thereof. The corner posts are connected at upper ends to a rectangular frame 102. Elongate sides of the frame arrangement can be braced by means of one or more cross members 104. The upper frame 102 can be similarly braced.

The frame structure or arrangement is such that its external dimensions are standardised according to transport, container or other applicable regulations or requirements. Clearly the frame structure is such that the components of the frame provide protection for the coils of barrier material which are positioned inside the frame and which are supported by the apparatus 10. The frame structure remains engaged with the apparatus but permits the coil material to be dispensed through an open end 106 of the frame. This is done in the manner which has been described. It is also possible for the coil material to be recovered onto the boom structure of the apparatus 10.

Advantageously upper and lower ends of the frame structure, at least at the corner posts, carry complementary formations 110 and 112 respectively. The formations 110 may be small recesses while the formations 112 may be small spigots of complementary size and shape. These formations are interengageable with each other and enable similar frames 100A, 100B, 100C to be stacked one on top of the other, as shown in FIG. 9. This is a desirable feature for it provides a mechanism whereby modules of the barrier material can be stored in a compact manner while providing protection for the barrier material. Each unit comprising apparatus 10 in combination with a frame structure 100 can be drawn from the store, when required, so that the coiled barrier material can be deployed as necessary.

The invention claimed is:

1. Apparatus for use with at least one coil of barrier material which is formed with a plurality of windings of the barrier material, the apparatus including a ground-engaging structure, a support which extends upwardly from the ground-engaging structure, a boom arrangement which has a first end, attached to the support, and a free end, and which is spaced from, and positioned above, the ground-engaging structure, the boom arrangement being insertable into the at least one coil of barrier material so that the at least one coil is then suspended from the boom structure, and a boom extension piece which is movable from a storage position to an operative position at which the boom extension piece projects from the free end of the boom arrangement, wherein:
the boom arrangement is shaped so that the at least one coil of barrier material is suspended, at least at two locations, from the boom arrangement; and
the boom arrangement includes at least two elongate boom members which project from the support and which are spaced apart thereby to provide support for the as least one coil of barrier material at the two locations.

2. Apparatus according to claim 1 wherein the boom extension piece is pivotally attached to the free end of the boom arrangement.

3. Apparatus according to claim 2 wherein, in the storage position, the boom extension piece hangs downwardly from the free end of the boom arrangement and acts to retain the at least one coil of barrier material on the boom arrangement.

4. Apparatus according to claim 1 wherein the boom extension piece includes an outer end, an inner end which is adjacent the free end of the boom structure, at least when the boom extension piece is in the operative position, and a region, between the outer end and the inner end, which is higher than the outer end and the inner end when the boom extension piece is in the operative position.

5. Apparatus according to claim 1 wherein the ground-engaging structure includes two spaced apart formations with which tines of a forklifter are engageable.

6. Apparatus according to claim 5 wherein each formation includes a recess into which a respective tine is insertable.

7. Apparatus according to claim 1 which includes a parallelepiped frame mounted to the ground-engaging structure and enclosing the boom arrangement.

8. Apparatus according to claim 7 wherein the frame has upper and lower complementary formations which enable the frame to be positioned below or above a similar frame in a stacked relationship.

9. Apparatus for use with at least one coil of barrier material which is formed with a plurality of windings of the barrier material, the apparatus including a ground-engaging structure, a support which extends upwardly from the ground-engaging structure, a boom arrangement which has a first end, attached to the support, and a free end, and which is spaced from, and positioned above, the ground-engaging structure, the boom arrangement being insertable into the at least one coil of barrier material so that the at least one coil is then suspended from the boom structure, and wherein the boom arrangement includes at least two elongate boom members which project from the support and which are spaced apart thereby to provide support for the at least one coil of barrier material at two locations.

* * * * *